(12) United States Patent
Fujita et al.

(10) Patent No.: US 12,355,040 B2
(45) Date of Patent: Jul. 8, 2025

(54) MANAGEMENT METHOD OF SECONDARY BATTERY, CHARGE METHOD OF SECONDARY BATTERY, MANAGEMENT DEVICE OF SECONDARY BATTERY, MANAGEMENT SYSTEM OF SECONDARY BATTERY, ELECTRODE GROUP, AND UNIT BATTERY

(71) Applicant: KABUSHIKI KAISHA TOSHIBA, Tokyo (JP)

(72) Inventors: Yumi Fujita, Tokyo (JP); Tomokazu Morita, Funabashi Chiba (JP); Nobukatsu Sugiyama, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 650 days.

(21) Appl. No.: 17/681,211

(22) Filed: Feb. 25, 2022

(65) Prior Publication Data

US 2023/0015417 A1 Jan. 19, 2023

(30) Foreign Application Priority Data

Jul. 14, 2021 (JP) .................... 2021-116243

(51) Int. Cl.
*H02J 7/00* (2006.01)
*H01M 4/13* (2010.01)
(Continued)

(52) U.S. Cl.
CPC ............ *H01M 10/44* (2013.01); *H01M 4/13* (2013.01); *H01M 4/505* (2013.01); *H01M 4/525* (2013.01);
(Continued)

(58) Field of Classification Search
CPC ........ H01M 10/44; H01M 10/48; H01M 4/13; H01M 4/505; H01M 4/525; H01M 4/5825;
(Continued)

(56) References Cited

U.S. PATENT DOCUMENTS

2012/0231346 A1 9/2012 Tsujii et al.
2013/0069598 A1* 3/2013 Tanaka ................ H01M 10/44
320/134

(Continued)

FOREIGN PATENT DOCUMENTS

CN 101853964 A * 10/2010
EP 2 530 482 A2 12/2012
(Continued)

OTHER PUBLICATIONS

Japan Patent Office, Office Action in JP App. No. 2021-116243, 4 pages, and machine translation, 4 pages (May 1, 2024).
(Continued)

*Primary Examiner* — Zixuan Zhou
(74) *Attorney, Agent, or Firm* — Finnegan, Henderson, Farabow, Garrett & Dunner, LLP

(57) ABSTRACT

In a management method of a secondary battery of one embodiment, a charge pattern in charge planned to be executed is set based on estimation data including an estimation result of an internal state of the secondary battery based on a measurement result of an electric current and a voltage of the secondary battery, target data including a target time for charging the secondary battery in the charge planned to be executed, and relation data indicative a relation of each of the internal state of the secondary battery and a charge condition of the secondary battery to a deterioration rate of the secondary battery. The charge pattern is set to be a charge pattern in which the deterioration rate does
(Continued)

not exceed a threshold and the secondary battery is charged during the target time.

11 Claims, 6 Drawing Sheets

(51) Int. Cl.
| | | |
|---|---|---|
| *H01M 4/505* | (2010.01) | |
| *H01M 4/525* | (2010.01) | |
| *H01M 4/58* | (2010.01) | |
| *H01M 10/44* | (2006.01) | |
| *H01M 10/48* | (2006.01) | |
| *H01M 4/02* | (2006.01) | |

(52) U.S. Cl.
CPC ......... *H01M 4/5825* (2013.01); *H01M 10/48* (2013.01); *H02J 7/0047* (2013.01); *H02J 7/0048* (2020.01); *H01M 2004/029* (2013.01); *H02J 7/00712* (2020.01); *H02J 7/007188* (2020.01)

(58) Field of Classification Search
CPC ......... H01M 2004/029; H02J 7/007188; H02J 7/00712; H02J 7/0047; H02J 7/0048
USPC .................................................. 320/127, 137
See application file for complete search history.

(56) References Cited

U.S. PATENT DOCUMENTS

| | | |
|---|---|---|
| 2018/0006338 A1 | 1/2018 | Sasakawa et al. |
| 2018/0261893 A1 | 9/2018 | Fujita et al. |
| 2018/0277843 A1 | 9/2018 | Yasuda et al. |
| 2021/0221243 A1* | 7/2021 | Kawamoto ........... H01M 10/48 |

FOREIGN PATENT DOCUMENTS

| | | |
|---|---|---|
| JP | 2012-251806 A | 12/2012 |
| JP | WO2017/042931 A1 | 3/2017 |
| JP | 2017-121103 A | 7/2017 |
| JP | 2017-121148 A | 7/2017 |
| JP | 2018-147827 | 9/2018 |
| JP | 2018-160420 A | 10/2018 |
| JP | 2019-4534 A | 1/2019 |
| JP | 2020-92598 | 6/2020 |
| JP | 2020-92598 A | 6/2020 |
| WO | WO 2011/049113 A1 | 4/2011 |
| WO | WO 2020/179228 A1 | 9/2020 |

OTHER PUBLICATIONS

National Institute of Technology and Evaluation (Japan), "Rapid increase! Laptop, mobile battery, smartphone accident—Be careful about recalled products and misuse—," News Release, 28 pages, and translation, 35 pages (Jul. 27, 2017).

N. Tsukamoto, "Smartphone high-speed charging goes to the 100W mark. Xiaomi shows a demo to fully charge 4000mAh in just 17 minutes," https://japanese.engadget.com/2019/03/28/100w-400mah-17/, 1 page, and translation, 2 pages (2019).

H. Kawakami, "China unmanned taxi, avoiding parking on the street, reporter test drive," Nihon Keizai Shimbun Electronic Edition, 4 pages, and translation, 5 pages (2021).

* cited by examiner

MANAGEMENT METHOD OF SECONDARY BATTERY, CHARGE METHOD OF SECONDARY BATTERY, MANAGEMENT DEVICE OF SECONDARY BATTERY, MANAGEMENT SYSTEM OF SECONDARY BATTERY, ELECTRODE GROUP, AND UNIT BATTERY

CROSS-REFERENCE TO RELATED APPLICATIONS

This application is based upon and claims the benefit of priority from Japanese Patent Application No. 2021-116243, filed Jul. 14, 2021; the entire contents of which are incorporated herein by reference.

FIELD

Embodiments described herein relate generally to a management method of a secondary battery, a charge method of a secondary battery, a management device of a secondary battery, a management system of a secondary battery, an electrode group, and a unit battery.

BACKGROUND

In recent years, a secondary battery, such as a lithium ion secondary battery, is mounted in battery-mounted devices such as a smartphone, a large-sized electricity storage device for an electric power system, a vehicle, a stationary power source device, a robot and a drone. In such a battery-mounted device, for example, when the residual capacitance of the secondary battery mounted in the battery-mounted device has decreased, the secondary battery needs to be charged. In the charge of the secondary battery, it is required to properly and safely charge the secondary battery, for example, by charging the secondary battery by such a charge pattern that a sharp deterioration of the secondary battery is suppressed. In addition, it is required to charge the secondary battery by effectively using a time in which the secondary battery of the battery-mounted device can be charged, among times of activities of the user of the battery-mounted device.

DETAILED DESCRIPTION

In an embodiment, a management method of a secondary battery is provided. In the management method, a charge pattern in charge that is planned to be executed is set based on estimation data including an estimation result of an internal state of the secondary battery, the estimation result being based on a measurement result of an electric current and a voltage of the secondary battery in charge or discharge of the secondary battery, target data including a target time for charging the secondary battery in the charge that is planned to be executed, and relation data indicative a relation of each of the internal state of the secondary battery and a charge condition of the secondary battery relative to a deterioration rate of the secondary battery. The charge pattern is set to be a charge pattern in which the deterioration rate does not exceed a threshold and the secondary battery is charged during the target time.

Hereinafter, embodiments will be described with reference to the accompanying drawings.

(Management System of Secondary Battery)

Figure 1:
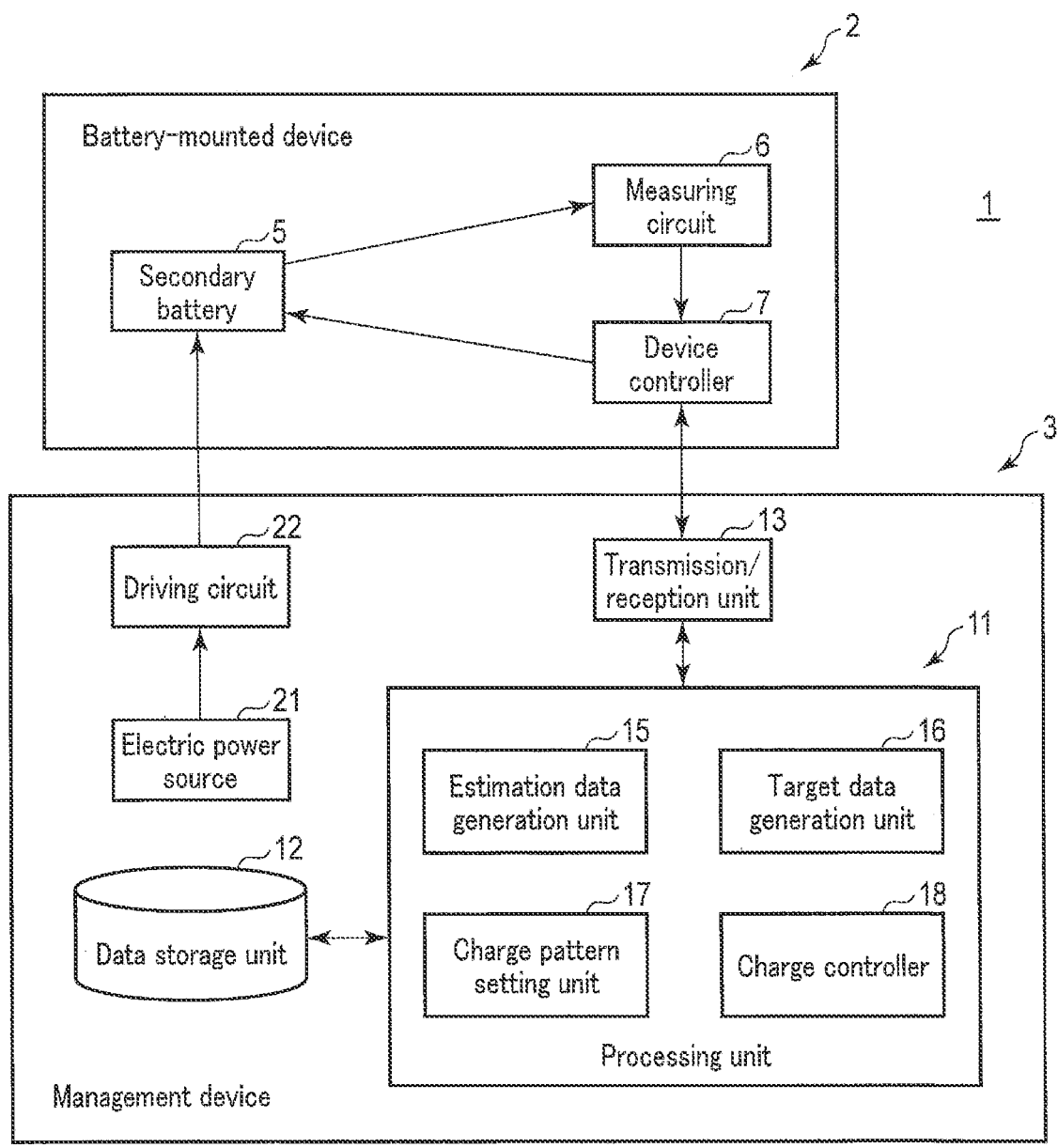
FIG. 1 is a schematic view illustrating an example of a management system according to an embodiment.

FIG. 1 is a schematic view illustrating an example of a management system according to an embodiment. As illustrated in FIG. 1, a management system 1 includes a battery-mounted device 2 and a management device 3. A secondary battery 5, a measuring circuit 6 and a device controller 7 are mounted in the battery-mounted device 2. Examples of the battery-mounted device 2 include a smartphone, a large-sized electricity storage device for an electric power system, a vehicle, a stationary power source device, a robot, a drone, and the like. Examples of the vehicle, which is the battery-mounted device 2, include a railway vehicle, an electric bus, an electric automobile, a plug-in hybrid automobile, an electric bicycle, and the like.

The secondary battery 5 is, for example, a lithium ion secondary battery, or the like. The secondary battery 5 may be formed of a unit cell (unit battery), or may be a battery module or a cell block, which is formed by electrically connecting a plurality of unit cells. When the secondary battery 5 is formed of unit cells, the unit cells may be electrically connected in series in the secondary battery 5, or may be electrically connected in parallel in the secondary battery 5. In addition, in the secondary battery 5, both of a series-connected structure in which a plurality of unit cells are connected in series, and a parallel-connected structure in which plurality of unit cells are connected in parallel, may be formed. Besides, the secondary battery 5 may be any one of a battery string, a battery array and a storage battery, in which a plurality of battery modules are electrically connected.

The measuring circuit 6 detects and measures parameters relating to the secondary battery 5, for example, in the state in which the secondary battery 5 is being charged or discharged. In the measuring circuit 6, for example, parameters are periodically measured at a predetermined timing in one-time charge or discharge, or the like, of the secondary battery 5. In this case, in the one-time charge or discharge, or the like, of the secondary battery 5, the measuring circuit 6 measures parameters relating to the secondary battery 5 at each of a plurality of measuring time points, and measures the parameters relating to the secondary battery 5 multiple times. The parameters relating to the secondary battery 5 include an electric current flowing in the secondary battery 5, a voltage of the secondary battery 5, and a temperature of the secondary battery 5. Thus, the measuring circuit 6 includes an amperemeter that measures the electric current, a voltmeter that measures the voltage, and a temperature sensor that measures the temperature.

The device controller 7 constitutes a processing device (computer) that controls the operation of the battery-mounted device 2, including the operation of the secondary battery 5. The device controller 7 controls the charge and discharge of the secondary battery 5 and controls the operation of the secondary battery 5, for example, by controlling the driving of a driving circuit (not shown) that is formed in the battery-mounted device 2. The device controller 7 includes a processor and a storage medium (non-transitory storage medium). The processor includes any one of a CPU (Central Processing Unit), an ASIC (Application Specific Integrated Circuit), a microcomputer, an FPGA (Field Programmable Gate Array), a DSP (Digital Signal Processor), and the like. The storage medium may include an auxiliary storage device, in addition to a main storage device such as a memory. Examples of the storage medium include a magnetic disk, an optical disc (CD-ROM, CD-R, DVD, or the like), a magneto-optical disc (MO, or the like), and a semiconductor memory. In the device controller 7, each of the number of processors and the number of storage media may be one or plural. In the device controller 7, the processor executes a program or the like stored in the storage medium or the like, thereby executing a process. In addition, in the device controller 7, the program that is executed by the processor may be stored in a computer (server) connected via a network such as the Internet, or may be stored in a server or the like in a cloud environment. In this case, the processor downloads the program via the network. In addition, in the example of FIG. 1, the processor of the device controller 7 executes a process, based on an instruction or the like, which is transmitted from the management device 3.

(Management Method of Secondary Battery, Charge Method of Secondary Battery, Management Device of Secondary Battery, and Management Program of Secondary Battery)

Hereinafter, the management device 3 will be described. In addition, a management method that is executed by the management device 3, and a charge method of the secondary battery, will be described, and a management program that is executed by the management device 3 will be described. The management device 3 manages the secondary battery 5, based on information relating to the secondary battery 5. Thus, the secondary battery 5 is a target of management by the management device 3. In the example of FIG. 1, the management device 3 is provided on the outside of the battery-mounted device 2. The management device 3 includes a processing unit 11, a data storage unit 12 and a transmission/reception unit 13. The management device 3 includes, for example, a processing device, such as a server, which can communicate with the device controller 7 via a network. In this case, like the device controller 7, the management device 3 includes a processor and a storage medium. In addition, the processing unit 11 executes at least a part of the process that is executed by the processor or the like of the management device 3, and the storage medium of the management device 3 functions as the data storage unit 12. Besides, the transmission/reception unit 13 is composed of an interface or the like of the processing device. The processing unit 11 can communicate with the device controller 7 of the battery-mounted device 2 via the transmission/reception unit 13, and can exchange information or the like with the device controller 7. The processing unit 11 includes an estimation data generation unit 15, a target data generation unit 16, a charge pattern setting unit 17 and a charge controller 18. Each of the estimation data generation unit 15, target data generation unit 16, charge pattern setting unit 17 and charge controller 18 executes a part of the process that is executed by the processing unit 11.

In addition, in the example of FIG. 1, the management device 3 functions also as a charger that can charge the secondary battery 5 of the battery-mounted device 2, and includes an electric power source 21 and a driving circuit 22. The electric power source 21 can electrically be connected to the secondary battery 5 via the driving circuit 22 and the driving circuit of the battery-mounted device 2. In the state in which the electric power source 21 is electrically connected to the secondary battery 5, the charge controller 18 of the processing unit 11 controls the driving of the driving circuit 22, transmits a control instruction to the device controller 7 via the transmission/reception unit 13, and causes the device controller 7 to control the driving of the driving circuit of the battery-mounted device 2. Thereby, the supply of electric power from the electric power source 21 to the secondary battery 5 is controlled, and the charge of the secondary battery 5 is controlled, by the charge controller 18 and the device controller 7.

Note that, in one example, the electric power source 21 may not be provided in the management device 3 that functions as the charger. In this case, an external electric power source separate from the management device 3 can electrically be connected to the secondary battery 5 via the driving circuit 22 and the driving circuit of the battery-mounted device 2. Also in the structure in which the electric power source 21 is not provided in the management device 3, in the state in which the external electric power source separate from the management device 3 is electrically connected to the secondary battery 5, the charge controller 18 of the processing unit 11 controls the driving of the driving circuit 22, transmits a control instruction to the device controller 7 via the transmission/reception unit 13, and causes the device controller 7 to control the driving of the driving circuit of the battery-mounted device 2. Thereby, the supply of electric power from the external electric power source to the secondary battery 5 is controlled, and the charge of the secondary battery 5 is controlled, by the charge controller 18 and the device controller 7.

In addition, in one example, the management device 3 does not function as the charger, and a charger, which can charge the secondary battery 5 of the battery-mounted device 2, is provided separately from the management device 3. In this case, the processing unit 11 of the management device 3 can communicate with the device controller 7 via the transmission/reception unit 13, and can communicate with the charger. In the state in which the charger is electrically connected to the secondary battery 5 of the battery-mounted device 2 and electric power can be supplied from the charger to the secondary battery 5, the charge controller 18 of the processing unit 11 transmits a control instruction to the device controller 7 via the transmission/reception unit 13, causes the device controller 7 to control the driving of the driving circuit of the battery-mounted device 2, transmits a control instruction to the charger, and causes the processor or the like of the charger to control the output or the like of electric power to the battery-mounted device 2 from the charger. Thereby, the supply of electric power from the charger to the secondary battery 5 is controlled, and the charge of the secondary battery 5 is controlled, by the charge controller 18, the device controller 7, and the processor or the like of the charger.

Besides, when the management device 3 does not function as the charger, the management device 3 may be a cloud server that is constituted in a cloud environment. The infrastructure of the cloud environment is constituted by a virtual processor such as a virtual CPU, and a cloud memory. Thus, when the management device 3 is the cloud server, the processing unit 11 executes at least a part of the process that is executed by the virtual processor. In addition, the cloud memory functions as the data storage unit 12.

Furthermore, the data storage unit 12 may be provided in a computer that is separate from the device controller 7 and the management device 3. In this case, the management device 3 is connected via a network to the computer in which the data storage unit 12 or the like is provided. Besides, the management device 3 may be mounted in the battery-mounted device 2. In this case, the management device 3 includes a processing device or the like, which is mounted in the battery-mounted device 2, and the processor or the like of the processing device mounted in the battery-mounted device 2 executes the process of the processing unit 11. Hereinafter, the process of the management device 3, including the process of the processing unit 11, will be described.

The processor or the like of the management device 3 diagnoses the deterioration state of the secondary battery 5, for example, by estimating the internal state of the secondary battery 5. The diagnosis of the deterioration state of the secondary battery 5, including the estimation of the internal state of the secondary battery 5, is periodically executed, for example, every year. When the internal state of the secondary battery 5 is estimated, the processing unit 11 transmits an instruction to the device controller 7 via the transmission/reception unit 13, and the device controller 7 charges or discharges the secondary battery 5 under predetermined conditions, based on the instruction transmitted from the processing unit 11. At this time, electric power may be supplied to the secondary battery 5 from the management device 3 that functions as the charger, and the secondary battery 5 may be charged under predetermined conditions.

Here, the data indicative of the predetermined conditions in the charge or discharge of the secondary battery 5, which is executed in the estimation of the internal state of the secondary battery 5, is stored, for example, in the data storage unit 12 or the like. The above-described predetermined conditions include, for example, a condition relating to an SOC (state of charge) at the time of starting charge or at the time of starting discharge; a condition relating to the SOC range of the secondary battery 5 in the charge or discharge; a condition relating to an electric current (the C rate of the secondary battery 5) flowing in the secondary battery 5 in the charge or discharge; a condition relating to the temperature of the secondary battery 5 in the charge or discharge; and a condition for ending the charge or discharge. Under the predetermined conditions, the current value of the electric current of the secondary battery 5 is set to a relatively small value, and the SOC range is set to a relatively large value. Thus, the internal state of the secondary battery 5 is estimated by charging or discharging the secondary battery 5 at a relatively low rate and with a relatively wide SOC range.

In the diagnosis of the internal state of the secondary battery 5, in the state in which the secondary battery 5 is being charged or discharged under the above-described predetermined conditions, the measuring circuit 6 measures the above-described parameters relating to the secondary battery 5. Then, the processing unit 11 of the management device 3 receives measurement data, which is indicative of a measurement result in the measuring circuit 6 of the above-described parameters relating to the secondary battery 5, from the device controller 7 or the like via the transmission/reception unit 13. The measurement data is generated by the device controller 7, for example, based on the measurement result or the like in the measuring circuit 6 in the charge or discharge under the predetermined conditions.

In the state in which the secondary battery 5 is being charged or discharged under the above-described predetermined conditions, the measuring circuit 6 measures the parameters relating to the secondary battery 5 at each of a plurality of measuring time points. Thus, the measurement data that the processing unit 11 receives includes measurement values of the parameters relating to the secondary battery 5 at each of a plurality of measuring time points (measurements of multiple times). In addition, the measurement data includes a time variation (time history) of the parameters relating to the secondary battery 5 in the charge or discharge of the secondary battery 5 under the above-described predetermined conditions. Accordingly, the measurement data includes a time variation (time history) of the electric current of the secondary battery 5, a time variation (time history) of the voltage of the secondary battery 5, and a time variation (time history) of the temperature of the secondary battery 5.

In addition, either the device controller 7, or the processing unit 11 (processor) or the like of the management device 3, may estimate a time variation (time history) in the charge or discharge of the secondary battery 5 under the above-described predetermined conditions in regard to either the charge amount or the SOC of the secondary battery 5, based on the measurement result or the like in the measuring circuit 6 of the parameters relating to the secondary battery 5. In addition, the measurement data may include data indicative of a relation of the measured parameters relating to the secondary battery 5 to either the estimated charge amount or SOC of the secondary battery 5. In this case, for example, the measurement data includes the data indicative of the relation of the measured voltage of the secondary battery 5 to either the estimated charge amount or SOC of the secondary battery 5. The processing unit 11 can write the above-described measurement data in the data storage unit 12.

Here, the charge amount of the secondary battery 5 can be calculated based on the charge amount (SOC) of the secondary battery 5 at the time of starting charge or at the time of starting discharge under the above-described predetermined conditions, and the time variation of the electric current of the secondary battery 5. In this case, the charge amount of the secondary battery 5 is calculated by a current integration method. Besides, the charge amount of the secondary battery 5 can also be calculated by a calculation method using the relation between an inter-terminal voltage and the charge amount in the secondary battery 5, an estimation method using a Kalman filter, and the like.

In addition, the SOC of the secondary battery 5 is defined, for example, based on the voltage of the secondary battery 5. In the secondary battery 5, as regards the voltage, a lower-limit voltage Vmin and an upper-limit voltage Vmax are defined. In the secondary battery 5, for example, a state, in which an open circuit voltage (OCV) or a voltage in discharge under a certain defined condition is the lower-limit voltage Vmin, is defined as a state in which the SOC is 0%, and a state, in which the open circuit voltage or the voltage in charge under a certain defined condition is the upper-limit voltage Vmax, is defined as a state in which the SOC is 100%. In addition, in the secondary battery 5, a discharge capacitance from the state in which the SOC is 100% to the state in which the SOC is 0%, or a charge capacitance from the state in which the SOC is 0% to the state in which the SOC is 100%, is the battery capacitance. Besides, in the secondary battery 5, the ratio of the residual charge amount up to the state in which the SOC is 0% to the battery capacitance is defined as the SOC. Accordingly, the SOC of the secondary battery 5 can be calculated based on the charge amount or the like of the secondary battery 5.

The estimation data generation unit 15 acquires the above-described measurement data including the measurement result relating to the electric current and voltage of the secondary battery 5, and estimates the internal state of the secondary battery 5, based on the measurement data. In the present embodiment, the estimation data generation unit 15 estimates internal state parameters indicative of the internal state of the secondary battery 5. In one example, the estimation data generation unit 15 analyzes at least the data indicative of the time variations of the electric current and voltage of the secondary battery 5 in the charge and discharge under the above-described predetermined conditions. In this case, a charge curve analysis or a discharge curve analysis in regard to the secondary battery 5 are executed by the estimation data generation unit 15. In addition, the estimation data generation unit 15 may analyze the data indicative of the time variation of the temperature of the secondary battery 5, in addition to the data indicative of the time variations of the electric current and voltage of the secondary battery 5.

Figure 2:
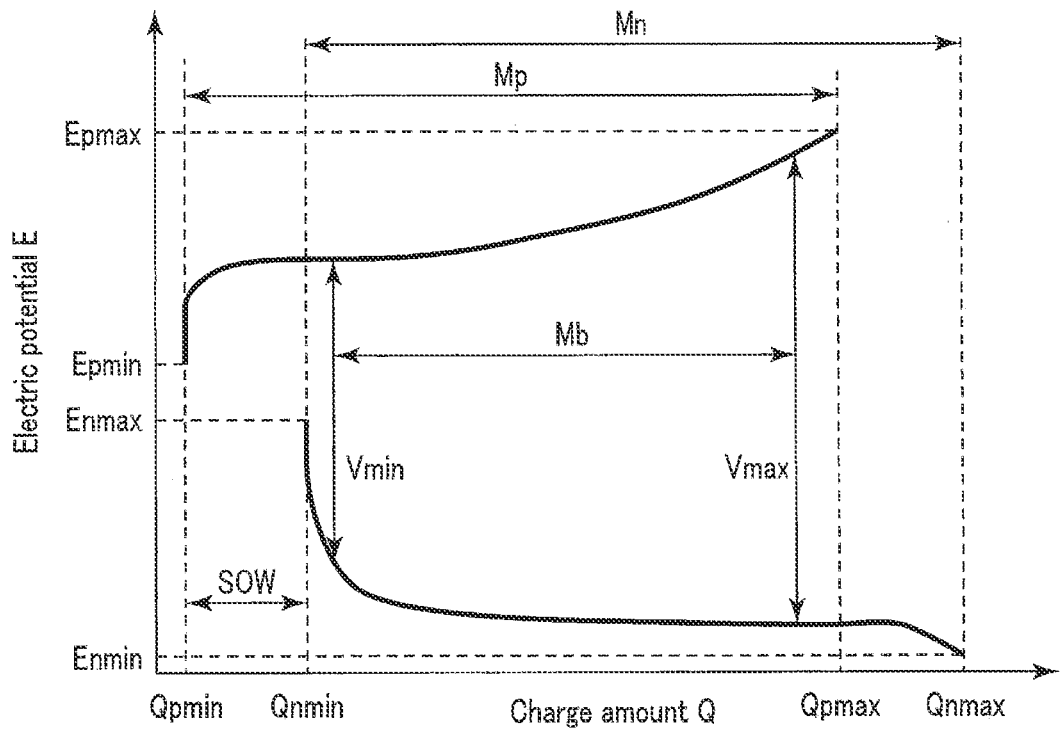
FIG. 2 is a schematic view for describing internal state parameters indicative of the internal state of a secondary battery.

FIG. 2 is a schematic view for describing the internal state parameters indicative of the internal state of the secondary battery. In FIG. 2, the abscissa axis indicates a charge amount Q, and the ordinate axis indicates an electric potential E. As illustrated in FIG. 2, in the secondary battery 5, as regards a positive electrode electric potential, a lower-limit electric potential Epmin and an upper-limit electric potential Epmax are defined, and the positive electrode electric potential increases as the charge amount of the positive electrode becomes greater. In addition, in the positive electrode, a charge amount in a state in which the positive electrode electric potential becomes the lower-limit electric potential Epmin is an initial charge amount Qpmin of the positive electrode, and a charge amount in a state in which the positive electrode electric potential becomes the upper-limit electric potential Epmax is an upper-limit charge amount Qpmax of the positive electrode. Furthermore, a charge amount until the charge amount of the positive electrode reaches the upper-limit charge amount Qpmax from the initial charge amount Qpmin is a positive electrode capacitance Mp of the secondary battery 5, which corresponds to the chargeable/dischargeable amount of the positive electrode of the second battery 5.

In the secondary battery 5, as regards a negative electrode electric potential, a lower-limit electric potential Enmin and an upper-limit electric potential Enmax are defined, and the negative electrode electric potential decreases as the charge amount of the negative electrode becomes greater. In addition, in the negative electrode, a charge amount in a state in which the negative electrode electric potential becomes the upper-limit electric potential Enmax is an initial charge amount Qnmin of the negative electrode, and a charge amount in a state in which the negative electrode electric potential becomes the lower-limit electric potential Enmin is an upper-limit charge amount Qnmax of the negative electrode. Furthermore, a charge amount until the charge amount of the negative electrode reaches the upper-limit charge amount Qnmax from the initial charge amount Qnmin is a negative electrode capacitance Mn of the secondary battery 5, which corresponds to the chargeable/dischargeable amount of the negative electrode of the second battery 5.

The internal state parameters of the secondary battery 5 include the above-described positive electrode capacitance Mp, negative electrode capacitance Mn, initial charge amount Qpmin of the positive electrode, and initial charge amount Qnmin of the negative electrode. In addition, the internal state parameters of the secondary battery 5 include a positive electrode mass that is a parameter corresponding to the positive electrode capacitance Mp, and a negative electrode mass that is a parameter corresponding to the negative electrode capacitance Mn. The positive electrode mass can be calculated based on the positive electrode capacitance and the kind of material, of which the positive electrode is formed. Similarly, the negative electrode mass can be calculated based on the negative electrode capacitance and the kind of material, of which the negative electrode is formed. Furthermore, the internal state parameters of the secondary battery 5 include a positive electrode capacity retention ratio and a negative electrode capacity retention ratio. Here, the positive electrode capacity retention ratio is the ratio of the estimated positive electrode capacitance to the positive electrode capacitance at the time of the start of use, and the negative electrode capacity retention ratio is the ratio of the estimated negative electrode capacitance to the negative electrode capacitance at the time of the start of use.

In addition, the internal state parameters of the secondary battery 5 include a shift of operation window (SOW) that is a shift between the initial charge amount Qpmin of the positive electrode and the initial charge amount Qnmin of the negative electrode. Further, the internal state parameters of the secondary battery 5 include a parameter relating to an internal resistance of the secondary battery 5. Note that FIG. 2 also illustrates a battery capacitance Mb that is one of battery characteristic parameters indicative of the battery characteristics of the secondary battery 5. The battery capacitance Mb corresponds to a charge amount until the voltage of the secondary battery 5 (the difference between the positive electrode electric potential and the negative electrode electric potential) reaches an upper-limit voltage Vmax from a lower-limit voltage Vmin.

In the present embodiment, a battery model of the secondary battery 5 is stored in the data storage unit 12. The battery model includes data indicative of a relation of the internal state of the secondary battery 5 to at least one of the voltage and the electric current of the secondary battery 5, and includes, for example, a calculation formula for calculating at least one of the voltage and the electric current of the secondary battery 5 from the internal state of the secondary battery 5. Accordingly, the battery model includes data indicative of a relation of the internal state parameters, such as the positive electrode capacitance and negative electrode capacitance, to at least one of the electric current and the voltage of the secondary battery 5. Note that the relation of the internal state to each of the electric current and the voltage of the secondary battery 5 varies in accordance with the temperature or the like of the secondary battery 5. Thus, in the battery model of the secondary battery 5, the relation of the internal state to at least one of the electric current and the voltage of the secondary battery 5 may be set for each of a plurality of mutually different temperatures.

In the above-described charge curve analysis or discharge curve analysis of the secondary battery 5, the estimation data generation unit 15 executes a fitting calculation (regression calculation) by using at least the measurement result, which relates to the voltage and electric current of the secondary battery 5 and is included in the measurement data, and the above-described data indicative of the relation of the internal state to at least one of the electric current and the voltage of the secondary battery 5. At this time, in the calculation formula for calculating at least the voltage and the electric current of the secondary battery 5 from the internal state of the secondary battery 5, the fitting calculation is executed by using one or more of the internal state parameters as a variable. In one example, the data indicative of the relation of the internal state of the secondary battery 5 to the voltage of the secondary battery 5 is used in the fitting calculation, and the relation of the internal state of the secondary battery 5 to the voltage of the secondary battery 5, which is indicated in the data, indicates the relation between the positive electrode electric potential and the charge amount of the positive electrode and the relation between the negative electrode electric potential and the charge amount of the negative electrode. Then, the estimation data generation unit 15 estimates the internal state of the secondary battery 5 by calculating, by the fitting calculation, one or more internal state parameters serving as a variable. The estimation data generation unit 15 generates estimation data indicative of an estimation result of the internal state of the secondary battery 5, including the estimation value of the internal state parameter of the secondary battery 5, and can write the generated estimation data in the data storage unit 12. Note that in the fitting calculation for calculating the internal state parameters, use may be made of the measurement result relating to the temperature of the secondary battery 5 and the data indicative of the relation of the internal state of the secondary battery 5 to the temperature of the secondary battery 5, in addition to the measurement result relating to the voltage and electric current of the secondary battery 5 and the data indicative of the relation of the internal state of the secondary battery 5 to the voltage and electric current of the secondary battery 5.

In one example, as the data indicative of the relation of the internal state of the secondary battery 5 to a voltage V(t) at a time instant t of the secondary battery 5, a calculation formula of equation (1) is included in the battery model. Then, the estimation data generation unit 15 estimates the internal state of the secondary battery 5 by executing the fitting calculation by using the measurement result of the voltage V(t) of the secondary battery 5 included in the measurement data, and the calculation formula of equation (1) included in the battery model. In the fitting calculation using equation (1), for example, the positive electrode capacitance Mp, negative electrode capacitance Mn, initial charge amount Qpmin of the positive electrode, initial charge amount Qnmin of the negative electrode, and parameter R relating to the internal resistance are set as the internal state parameters, and the fitting calculation is executed by using these internal state parameters as variables.

$$V(t) = Ep(Mp, Qpmin) - En(Mn, Qnmin) + R \times I \quad (1)$$

In equation (1), I is an electric current of the secondary battery 5, and a measurement value or the like included in the measurement data is used as the electric current I. In addition, in equation (1), Ep(Mp, Qpmin) indicates a function for calculating an open circuit electric potential (OCP) of the positive electrode by using at least the positive electrode capacitance Mp and the initial charge amount Qpmin of the positive electrode as variables, and En(Mn, Qnmin) indicates a function for calculating an open circuit electric potential (OCP) of the negative electrode by using at least the negative electrode capacitance Mn and the initial charge amount Qnmin of the negative electrode as variables.

Note that methods of estimating the internal state of the secondary battery by the charge curve analysis are disclosed in reference document 1 (Jpn. Pat. Appln. KOKAI Publication No. 2018-147827), reference document 2 (Jpn. Pat. Appln. KOKAI Publication No. 2012-251806) and reference document 3 (Jpn. Pat. Appln. KOKAI Publication No. 2020-92598). In each of reference document 1 to reference document 3, too, the internal state of the secondary battery is estimated by executing the fitting calculation by using at least the measurement result relating to the electric current and voltage of the secondary battery 5 and the data indicative of the relation of the internal state of the secondary battery to the voltage and electric current of the secondary battery. In the embodiment, like any one of reference document 1 to reference document 3, the internal state of the secondary battery 5 may be estimated. Besides, when estimating the internal state of the secondary battery 5, the estimation data generation unit 15 reads out the battery model including the calculation formula of equation (1) or the like from the data storage unit 12. In addition, the estimation data generation unit 15 can store, in the data storage unit 12, estimation values that become necessary in a subsequent process, among provisional estimation values and final estimation values relating to the internal state parameters.

In addition, the estimation data generation unit 15 may estimate battery characteristics of the secondary battery 5, based on the estimated internal state of the secondary battery 5. The battery characteristics of the secondary battery 5 include the open circuit voltage and OCV curve of the secondary battery 5, and the like, in addition to the above-described battery capacitance Mb. Here, the OCV curve is a function indicative of the relation between a parameter other than the OCV, and the OCV, and is, for example, a function indicative of the relation of the OCV to the SOC or the charge amount. In addition, the internal resistance of the secondary battery 5 indicates the internal state of the secondary battery 5, as described above, and also indicates the battery characteristics of the secondary battery 5. Each of reference document 1 to reference document 3 discloses a method of estimating battery characteristics of the secondary battery 5, based on the internal state of the secondary battery. In the embodiment, like any one of reference document 1 to reference document 3, the battery characteristics of the secondary battery 5 may be estimated. When the battery characteristics of the secondary battery 5 were estimated, the estimation data includes the estimation result of the battery characteristics of the secondary battery 5, in addition to the estimation result of the internal state of the secondary battery 5.

Note that the above-described estimation of the internal state of the secondary battery 5 does not need to be executed by the management device 3, and may be executed by a processing device (computer) that is separate from the management device 3. In this case, the estimation data generation unit 15 is not provided in the processing unit 11 of the management device 3. Furthermore, the processing unit 11 of the management device 3 receives the estimation data including the estimation result of the internal state of the secondary battery 5, via the transmission/reception unit 13 from the processing device that executed the estimation of the internal state. Besides, the processing unit 11 can write the received estimation data in the data storage unit 12.

The target data generation unit 16 generates target data indicative of target values in the charge of the secondary battery 5, which is planned after the present time point. The target data generated by the target data generation unit 16 includes a target time for charging the secondary battery 5 in the charge that is planned to be executed, and includes a target SOC of the secondary battery at a time of the end of the charge that is planned to be executed. The target time corresponds to a time that is available for the charge of the secondary battery 5 in the charge that is planned to be executed. The target data generation unit 16 acquires the above-described target SOC, based on either the information received via the transmission/reception unit 13, or the information that is input through a user interface (not shown) or the like provided in the management device 3. In addition, based on either the information received via the transmission/reception unit 13 or the information that is input through the user interface or the like of the management device 3, the target data generation unit 16 acquires an activity content that is performed by the user of the battery-mounted device 2, in which the secondary battery 5 is mounted, in parallel in time with the charge that is planned to be executed. Further, based on the activity content that is performed by the user of the battery-mounted device 2 in parallel in time with the charge that is planned to be executed, the target data generation unit 16 calculates the target time. The target data generation unit 16 can write the generated target data in the data storage unit 12.

Here, examples of the activity content, which is performed by the user of the battery-mounted device 2 in parallel in time with the charge that is planned to be executed, include toilets in a department store, a concert hall, a movie theater and the like; shopping in a department store, a supermarket, a convenience store and the like; movement by a vehicle, an escalator, an elevator and the like; and sitting in a restaurant, a concert, a movie and the like. The target data generation unit 16 calculates the target time by assuming that the time in which the user of the battery-mounted device 2 is performing the above-described activity content is the time in which the charge of the secondary battery 5 can be executed. In one example, an owner or the like of a charger provides a service of charge to the secondary battery 5, and a service different from the charge, to the user of the battery-mounted device 2, in exchange for the payment of a value or the like by the user of the battery-mounted device 2. Then, the user of the battery-mounted device 2 performs an activity corresponding to the service that is provided together with the service of the charge, in parallel in time with the charge that is planned to be executed. At this time, based on the content of the service provided together with the charge, the target data generation unit 16 estimates the activity content performed by the user of the battery-mounted device 2. Further, the target data generation unit 16 calculates the target time, based on the estimated activity content, i.e. the activity content corresponding to the content of the service provided together with the charge.

Figure 3:
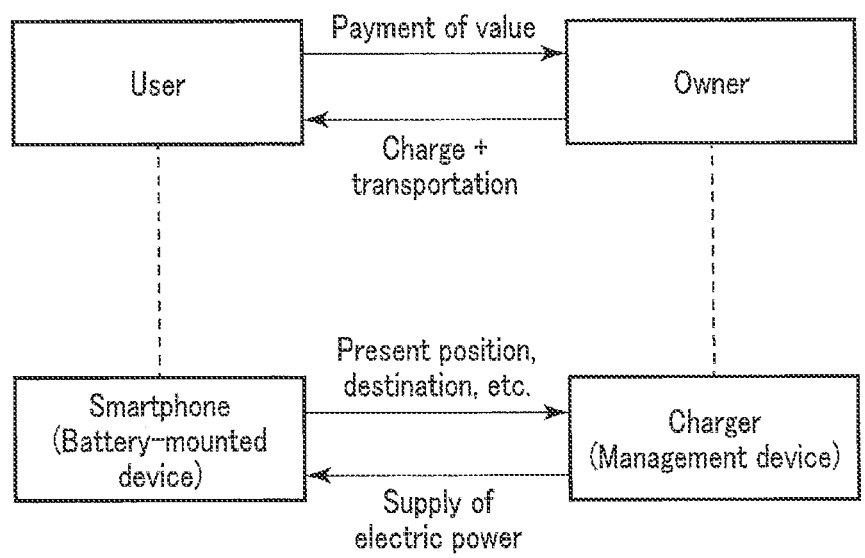
FIG. 3 is a schematic view illustrating an example in which, in the embodiment, a service of charge of a secondary battery, and a service different from the charge, are provided to a user of a battery-mounted device.

FIG. 3 is a schematic view illustrating an example in which, in the embodiment, a service of charge of a secondary battery, and a service different from the charge, are provided to a user of a battery-mounted device. In the example of FIG. 3, the battery-mounted device 2 is a smartphone, and an owner or the like of a charger provides charge of the secondary battery 5, and transportation by a vehicle or the like, to the user of the battery-mounted device 2, in exchange for the payment of a value or the like by the user of the smartphone. In this case, the user of the smartphone inputs, by the smartphone, information indicative of the present position and a destination or the like by the transportation, and transmits the information indicative of the present position and the destination or the like by the transportation to the management device 3 functioning as the charger. In addition, the target data generation unit 16 of the management device 3 calculates the target time by assuming that the transportation time of the user of the smartphone to the destination is the time in which the charge of the secondary battery 5 can be executed. In addition, based on the calculated target time or the like, the processing unit 11 of the management device 3 causes electric power to be supplied to the battery-mounted device 2, and causes the secondary battery 5 to be charged as described later.

Note that the above-described generation of the target data does not need to be executed by the management device 3, and may be executed by a processing device (computer) that is separate from the management device 3. In this case, the target data generation unit 16 is not provided in the processing unit 11 of the management device 3. Furthermore, the processing unit 11 of the management device 3 receives the target data including the target time that is available for the charge that is planned to be executed, via the transmission/reception unit 13 from the processing device that executed the generation of the target data. Besides, the processing unit 11 can write the received target data into the data storage unit 12.

In addition, in the present embodiment, the data storage unit 12 stores relation data indicative of a relation of each of the internal state of the secondary battery 5 and the charge condition in the charge of the secondary battery 5 relative to a deterioration rate (deterioration speed) of the secondary battery 5. In the relation data, for example, a relation between the charge condition of the secondary battery 5 and the deterioration rate of the secondary battery 5 is indicated in regard to each of a plurality of mutually different internal states. At least one of the above-described internal state parameters, which include the positive electrode capacitance and negative electrode capacitance, or the like, is different among the internal states in regard to which the relation between the charge condition and the deterioration rate is indicated. The relation data indicates the relation between one or more of the parameters relating to the charge condition and the deterioration rate of the secondary battery 5 in regard to each of the internal states.

Here, the charge conditions in the charge of the secondary battery 5 include a condition relating to the SOC range between the time of the start of charge and the time of the end of charge, a condition relating to the electric current flowing in the secondary battery 5 in the charge (the charge rate of the secondary battery 5), and a condition relating to the temperature of the secondary battery 5 in the charge. In addition, the parameters relating to the charge condition include the SOC of the secondary battery 5 at the time of charge, the charge rate of the secondary battery 5 (the charge current of the secondary battery 5), and the temperature, or the like, of the secondary battery 5 at the time of charge.

Figure 4A:
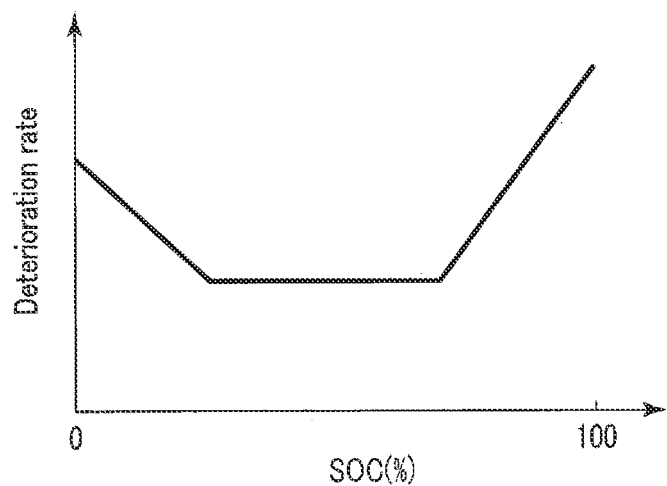
FIG. 4A is a schematic view illustrating an example of information indicated in relation data stored in a data storage unit in the embodiment.
Figure 4B:
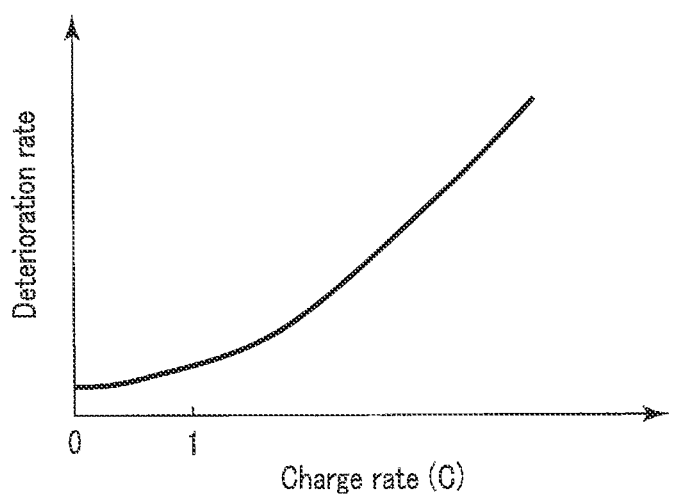
FIG. 4B is a schematic view illustrating an example of information which is different from the information of FIG. 4A and is indicated in the relation data stored in the data storage unit in the embodiment.

FIG. 4A is a schematic view illustrating an example of information indicated in the relation data stored in the data storage unit in the embodiment. In addition, FIG. 4B is a schematic view illustrating an example of information which is different from the information of FIG. 4A and is indicated in the relation data stored in the data storage unit in the embodiment. FIG. 4A illustrates a relationship of the SOC of the secondary battery 5 at the time of charge relative to the deterioration rate of the secondary battery 5, in the case where the secondary battery 5 is in a predetermined internal state, and the parameters relating to the charge condition, other than the SOC of the secondary battery 5 at the time of charge, which include the temperature and the charge rate of the secondary battery 5 at the time of charge, have predetermined values. In FIG. 4A, the abscissa axis indicates the SOC, and the ordinate axis indicates the deterioration rate. In addition, FIG. 4B illustrates a relationship of the charge rate relative to the deterioration rate of the secondary battery 5, in the case where the secondary battery 5 is in the same predetermined internal state as in FIG. 4A, and the parameters relating to the charge condition, other than the charge rate, which include the temperature of the secondary battery 5 at the time of charge and the SOC of the secondary battery 5 at the time of charge, have predetermined values. In FIG. 4B, the abscissa axis indicates the charge rate, and the ordinate axis indicates the deterioration rate. FIG. 4A illustrates that the deterioration rate of the secondary battery 5 increases in the charge in a low SOC region and in a high SOC region, if the other conditions are identical. FIG. 4B illustrates that the deterioration rate of the secondary battery 5 increases as the charge rate becomes higher, if the other conditions are identical.

In addition, the relation data may indicate not only the relation of each of the internal state of the secondary battery 5 and the charge condition of the secondary battery 5 relative to the deterioration rate of the entirety of the secondary battery 5, but also the relation of each of the internal state of the secondary battery 5 and the charge condition of the secondary battery 5 relative to the deterioration rate of each of the positive electrode and negative electrode of the secondary battery 5. In one example, the relation data indicates a relation between one or more of the parameters relating to the charge condition and the deterioration rate of the positive electrode, and a relation between one or more of the parameters relating to the charge condition and the deterioration rate of the negative electrode, in regard to each of a plurality of mutually different internal states.

Besides, the relation data may indicate a relation between the use history of the secondary battery 5 and the deterioration rate of the secondary battery 5, in addition to the relation of each of the internal state of the secondary battery 5 and the charge condition in the charge of the secondary battery 5 relative to the deterioration rate of the secondary battery 5. In this case, the relation data indicates, for example, the relation between the charge condition of the secondary battery 5 and the deterioration rate of the secondary battery 5, in regard to each of conditions in which at least one of the internal state and the use history is different. Among the conditions in which the relation between the charge condition and the deterioration rate is indicated, one or more of the above-described internal state parameters including the positive electrode capacitance and negative electrode capacitance and the parameters relating to the use history are different. Examples of the parameters relating to the use history include the number of times of charge and the number of times of discharge from the time of the start of use of the secondary battery 5, an elapsed time from the time of the start of use of the secondary battery 5, and an integrated value (net charge time) of the charge time and an integrated value (net discharge time) of the discharge time from the time of the start of use of the secondary battery 5.

Furthermore, the information indicated by the relation data does not need to be a graph as illustrated in FIG. 4A and FIG. 4B, or the like, and may be a function or the like which derives the deterioration rate of the secondary battery 5. In one example, in the relation data, a function for deriving the deterioration rate of the secondary battery 5 from one or more of the parameters relating to the charge condition is defined in regard to each of mutually different internal states. In another example, a function for deriving the deterioration rate of the secondary battery 5 from one or more of the internal state parameters and one or more of the parameters relating to the charge condition is defined in the relation data. In addition, when the relation data also indicates a relation between the use history of the secondary battery 5 and the deterioration rate of the secondary battery 5, a function for deriving the deterioration rate of the secondary battery 5 from one or more of the internal state parameters, one or more of the parameters relating to the charge condition, and one or more of the parameters relating to the use history may be defined in the relation data.

Note that reference document 3 discloses the data indicative of the relation of each of the internal state of the secondary battery and the charge condition of the secondary battery relative to the deterioration rate of the secondary battery 5. For example, reference document 3 discloses a deterioration model and a deterioration map, or the like, as the relation of each of the internal state of the secondary battery and the charge condition of the secondary battery relative to the deterioration rate of the secondary battery 5. In the present embodiment, the relation data stored in the data storage unit 12 may indicate the deterioration model and deterioration map, or the like, of reference document 3.

The charge pattern setting unit 17 acquires estimation data including an estimation result of the internal state; target data including a target time for charging the secondary battery 5 in the charge that is planned to be executed; and relation data indicative of the relation of each of the internal state of the secondary battery 5 and the charge condition of the secondary battery 5 relative to the deterioration rate of the secondary battery 5. In addition, the charge pattern setting unit 17 sets a charge pattern in the charge of the secondary battery 5, which is planned to be executed, based on the estimation data, the target data and the relation data. At this time, the charge pattern setting unit 17 acquires a real-time state of the secondary battery 5, and sets the charge pattern, based on the real-time state of the secondary battery 5, in addition to the above-described estimation data, target data and relation data. The real-time state of the secondary battery 5 includes a real-time SOC of the secondary battery 5 and a real-time temperature, or the like, of the secondary battery 5. The charge pattern setting unit 17 of the processing unit 11 acquires the real-time state of the secondary battery 5 including the real-time SOC and temperature, or the like, of the secondary battery 5, for example, by receiving the real-time state from the battery-mounted device 2 via the transmission/reception unit 13.

Figure 5:
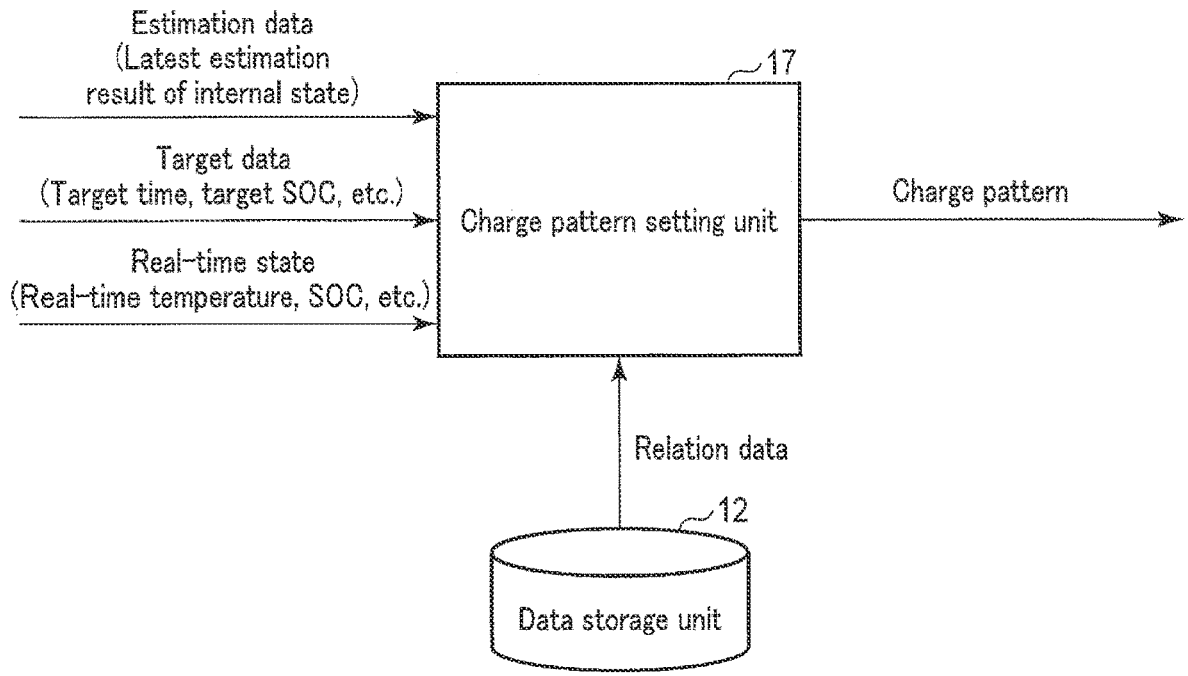
FIG. 5 is a schematic view for describing a process in a charge pattern setting unit of a processing unit in the embodiment.

FIG. 5 is a schematic view for describing a process in the charge pattern setting unit of the processing unit in the embodiment. As illustrated in FIG. 5, the estimation data is input to the charge pattern setting unit 17, and thereby the latest estimation result of the internal state of the secondary battery 5 is input to the charge pattern setting unit 17, and the latest estimation result of the internal state parameters including the positive electrode capacitance, negative electrode capacitance and internal resistance, or the like, is input to the charge pattern setting unit 17. In addition, the target data is input to the charge pattern setting unit 17, and thereby the target time for charging the secondary battery 5 in the charge that is planned to be executed, and the target SOC of the secondary battery 5 at the time of the end of the charge that is planned to be executed, are input to the charge pattern setting unit 17. Furthermore, the real-time state of the secondary battery 5, including the real-time SOC and temperature of the secondary battery 5, is input to the charge pattern setting unit 17. Besides, the charge pattern setting unit 17 acquires the above-described relation data stored in the data storage unit 12. Then, based on the information and relation data which are input, the charge pattern setting unit 17 sets the charge pattern in the charge of the secondary battery 5, which is planned to be executed, and outputs the set charge pattern. The charge pattern setting unit 17 can write the set charge pattern in the data storage unit 12.

The charge pattern setting unit 17 sets the charge pattern in the charge that is planned to be executed, such that the charge pattern is set to be a charge pattern in which the deterioration rate of the secondary battery 5 does not exceed a threshold and the secondary battery 5 is charged during the target time. Accordingly, in the set charge pattern, electric power in such a range that the deterioration rate of the secondary battery 5 does not exceed the threshold is supplied to the secondary battery 5 from the start to the end of the target time. In one example, such a charge pattern is set that the deterioration rate of the secondary battery 5 does not exceed the threshold and the secondary battery 5 is charged continuously or substantially continuously during the target time. The threshold relating to the deterioration rate of the secondary battery 5 may be stored in the data storage unit 12 or the like, or may be input by a user interface or the like. In addition, the charge pattern setting unit 17 sets the charge pattern in the charge that is planned to be executed to be the charge pattern in which the SOC of the secondary battery 5 at the end of the target time becomes the target SOC indicated in the target data. Accordingly, in the set charge pattern, the SOC of the secondary battery 5 increases from the real-time SOC to the target SOC by the charge during the target time.

In the setting of the charge pattern, the charge pattern setting unit 17 specifies, for example, the internal state corresponding to the internal state of the secondary battery 5 estimated in the estimation data, from among the internal states indicated in the relation data. Then, the charge pattern setting unit 17 sets the charge pattern by using the relation between the charge condition of the secondary battery 5 and the deterioration rate of the secondary battery 5 in the specified internal state. At this time, based on the relation between the charge condition of the secondary battery 5 and the deterioration rate of the secondary battery 5 in the specified internal state, and the real-time state or the like of the secondary battery 5, the charge pattern setting unit 17 calculates an upper-limit value of the charge current (charge rate) of the secondary battery 5 under the condition that the deterioration rate does not exceed the threshold. In addition, the charge pattern setting unit 17 calculates a variation with time of the above-described upper-limit value of the charge current during the charge that is planned to be executed, that is, a variation with time of the upper-limit value of the charge current during the target time. Then, based on the calculation result of the variation with time of the upper-limit value of the charge current during the target time, the charge pattern setting unit 17 sets, as the charge pattern in the charge that is planned to be executed, a charge pattern in which the charge current does not continuously exceed the upper-limit value during the target time.

In one example, the charge pattern setting unit 17 specifies the internal state corresponding to the internal state of the secondary battery 5 estimated in the estimation data, from among the internal states indicated in the relation data, and calculates the above-described upper-limit value of the charge current, and the variation with time of the upper-limit value of the charge current during the target time, based on the relation of each of the temperature, SOC and charge current (charge rate) of the secondary battery 5 relative to the deterioration rate of the secondary battery 5 in the specified internal state. In this case, based on the real-time state of the secondary battery 5 and the target data, or the like, the charge pattern setting unit 17 estimates the temperature and SOC of the secondary battery 5 at each of time points during the target time. Then, the charge pattern setting unit 17 calculates the value of the charge current (charge rate) at which the deterioration rate of the secondary battery 5 becomes equal to the threshold, based on the estimated temperature and SOC of the secondary battery 5, and the relation of each of the temperature, SOC and charge current of the secondary battery 5 relative to the deterioration rate of the secondary battery 5 in the specified internal state, with respect to each of time points during the target time. Then, the charge pattern setting unit 17 calculates the value of the charge current at which the deterioration rate becomes equal to the threshold, as the upper-limit value of the charge current of the secondary battery 5 under the condition that the deterioration rate does not exceed the threshold, with respect to each of time points during the target time. Thereby, the variation with time of the upper-limit value of the charge current during the target time is calculated.

Note that reference document 3 discloses a method of calculating the upper-limit value of the charge current of the secondary battery under the condition that the deterioration rate does not exceed the threshold, by using the estimation result of the internal state of the secondary battery, and the data indicative of the relation of each of the internal state of the secondary battery and the charge condition of the secondary battery relative to the deterioration rate of the secondary battery. In the present embodiment, like reference document 3, the upper-limit value of the charge current of the secondary battery 5 under the condition that the deterioration rate does not exceed the threshold may be calculated by using the estimation result and the relation data, or the like.

Figure 6:
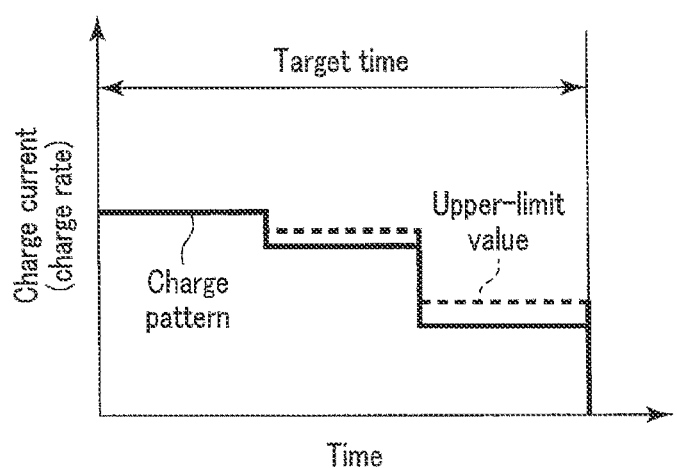
FIG. 6 is a schematic view illustrating an example of a charge pattern that is set by the charge pattern setting unit of the embodiment.

FIG. 6 is a schematic view illustrating an example of the charge pattern that is set by the charge pattern setting unit of the embodiment. In FIG. 6, the abscissa axis indicates a time with reference to the time of the start of charge that is planned to be executed, and the ordinate axis indicates the charge current (charge rate). In addition, FIG. 6 illustrates, by a solid line, the variation with time of the set charge pattern, and illustrates, by a broken line, the variation with time of the above-described upper-limit value of the charge current (charge rate) of the secondary battery 5 under the condition that the deterioration rate does not exceed the threshold. As in the example of FIG. 6, in the present embodiment, the charge pattern in the charge that is to be planned to be executed is set to be the charge pattern in which the charge current does not continuously exceed the above-described upper-limit value during the target time. Thus, by the secondary battery 5 being charged by the set charge pattern, the degradation rate of the secondary battery 5 is continuously kept at the threshold or less during the target time, and the degradation rate of the secondary battery 5 does not continuously exceed the threshold during the target time. Furthermore, as in the example of FIG. 6, in the present embodiment, the charge pattern in the charge that is to be planned to be executed is set to be the charge pattern in which the secondary battery 5 is charged during the target time. Specifically, the charge pattern is set in which the secondary battery 5 is charged from the start to the end of the target time.

The charge controller 18 acquires the charge pattern that is set by the charge pattern setting unit 17. Then, when executing the charge in which the charge pattern is set, the charge controller 18 controls the supply of electric power from the electric power source 21 or the like to the secondary battery 5, based on the set charge pattern, thereby charging the secondary battery 5 in accordance with the set charge pattern. The control of the supply of electric power to the secondary battery 5 by the charge controller 18, i.e. the control of the charge of the secondary battery 5, is executed as described above.

Note that the above-described process by the charge controller 18 does not need to be executed by the management device 3, and may be executed by a processing device (computer) that is separate from the management device 3 including the processing device of the battery-mounted device 2. In this case, the charge controller 18 is not provided in the processing unit 11 of the management device 3. Furthermore, the processing unit 11 of the management device 3 transmits, via the transmission/reception unit 13, the charge pattern, which the charge pattern setting unit 17 sets, to the processing device that executes the control of charge of the secondary battery 5.

Figure 7:
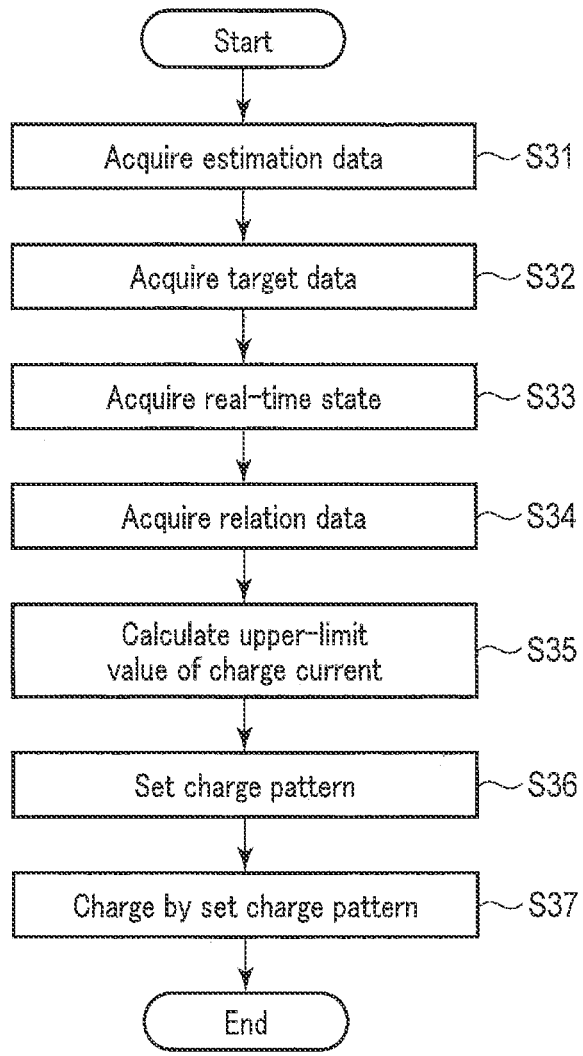
FIG. 7 is a flowchart illustrating an example of a process that is executed by the processing unit of a management device according to the embodiment.

FIG. 7 is a flowchart illustrating an example of a process that is executed by the processing unit of the management device according to the embodiment. The process illustrated in FIG. 7 is executed by the charge pattern setting unit 17 and the charge controller 18 when the target data including the target time is generated and the secondary battery 5 of the battery-mounted device 2 is charged based on the generated target data. If the process of FIG. 7 is started, the charge pattern setting unit 17 acquires estimation data indicative of a latest estimation result of the internal state of the secondary battery 5 (S31). In addition, the charge pattern setting unit 17 acquires target data including a target time for charging the secondary battery 5 in the charge that is planned to be executed (S32). Then, the charge pattern setting unit 17 acquires a real-time state of the secondary battery 5, including the real-time SOC and temperature of the secondary battery 5 (S33). Furthermore, the charge pattern setting unit 17 acquires, from the data storage unit 12, relation data indicative a relation of each of the internal state of the secondary battery 5 and the charge condition of the secondary battery 5 relative to the deterioration rate of the secondary battery 5 (S34).

Subsequently, the charge pattern setting unit 17 calculates, as described above, the upper-limit value of the charge current (charge rate) of the secondary battery 5 under the condition that the deterioration rate does not exceed the threshold, based on the estimation data, the target data and the relation data (S35), and calculates the above-described variation with time of the upper-limit value of the charge current during the charge that is planned to be executed. Further, based on the calculation result of the variation with time of the upper-limit value of the charge current during the target time, the charge pattern setting unit 17 sets, as the charge pattern in the charge that is planned to be executed, such a charge pattern that the charge current does not continuously exceed the upper-limit value during the target time (S36). At this time, the charge pattern in the charge that is planned to be executed is set to be the charge pattern in which the deterioration rate does not exceed the threshold and the secondary battery 5 is charged during the target time. Then, the charge controller 18 causes the secondary battery 5 to be charged by the charge pattern that is set by the charge pattern setting unit 17 (S37).

As described above, in the present embodiment, the charge pattern in the charge that is planned to be executed is set based on the estimation data including the estimation result of the internal state of the secondary battery 5; the target data including the target time for charging the secondary battery 5 in the charge that is planned to be executed; and the relation data indicative the relation of each of the internal state of the secondary battery 5 and the charge condition of the secondary battery relative to the deterioration rate of the secondary battery 5. Furthermore, the charge pattern in the charge that is planned to be executed is set to be the charge pattern in which the deterioration rate does not exceed the threshold and the secondary battery 5 is charged during the target time. Since the secondary battery 5 is charged by the charge pattern in which the deterioration rate does not exceed the threshold, the deterioration of the secondary battery 5 due to the charge can properly be suppressed, and the secondary battery 5 can safely and properly be charged. Moreover, since the secondary battery 5 is charged by the charge pattern in which the secondary battery 5 is charged during the target time, the target time corresponding to the time in which the secondary battery 5 can be charged can effectively be used, and the secondary battery 5 can be charged. Therefore, in the present embodiment, the secondary battery 5 can safely and properly be charged by effectively using the time in which the secondary battery 5 can be charged.

Additionally, in the present embodiment, the target time in the charge that is planned to be executed is calculated based on the activity content that is performed by the user of the battery-mounted device 2, in which the secondary battery 5 is mounted, in parallel in time with the charge that is planned to be executed. Therefore, the secondary battery 5 can be charged by appropriately using a time in which the secondary battery 5 can be charged, among times of activities of the user of the battery-mounted device 2.

Additionally, in the present embodiment, the target data includes the target SOC of the secondary battery 5 at the time of the end of the charge that is planned to be executed, and the charge pattern in the charge that is planned to be executed is set to be the charge pattern in which the SOC of the secondary battery 5 at the end of the target time becomes the target SOC. Thereby, in the charge that is planned to be executed, the secondary battery 5 can more appropriately be charged. Furthermore, in the present embodiment, the above-described relation data, which is used for setting the charge pattern in the charge that is planned to be executed, may indicate the relation of the use history of the secondary battery 5 relative to the deterioration rate of the secondary battery 5, in addition to the relation of each of the internal state of the secondary battery 5 and the charge condition of the secondary battery 5 relative to the deterioration rate of the secondary battery 5. Since the data indicative of the relation between the use history of the secondary battery 5 and the deterioration rate of the secondary battery 5 is used for setting the charge pattern, the charge that is planned to be executed can be executed by the charge pattern in which the deterioration of the secondary battery 5 due to the charge can more appropriately be suppressed.

Additionally, in the present embodiment, in the setting of the charge pattern, the upper-limit value of the charge current of the secondary battery 5 under the condition that the deterioration rate does not exceed the threshold, and the variation with time of the upper-limit value of the charge current during the target time, are calculated based on the estimation data and the relation data, or the like. Besides, the charge pattern, in which the charge current does not continuously exceed the upper-limit value during the target time, is set as the charge pattern in the charge that is planned to be executed. Thereby, the charge pattern, in which the deterioration rate does not exceed the threshold, is properly set as the charge pattern in the charge that is planned to be executed.

(Electrode Group and Unit Battery)

Figure 8:
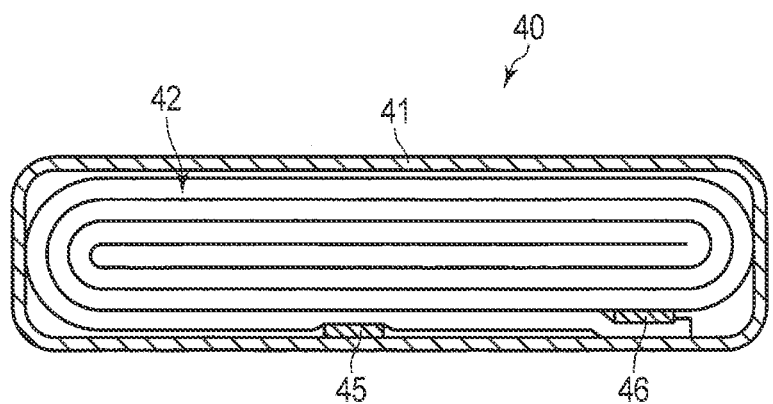
FIG. 8 is a schematic view illustrating an example of a unit battery used in the management system according to the embodiment.

Hereinafter, an example of a unit battery (unit cell), which forms the above-described secondary battery 5, will be described. The above-described secondary battery 5 may be formed of only one unit battery to be described below, or may be formed by providing a plurality of unit batteries, each of which is to be described below, and electrically connecting the unit batteries. The unit battery to be described below is, for example, a battery cell that forms a lithium ion secondary battery. FIG. 8 is a schematic view illustrating an example of a unit battery used in the management system according to the embodiment. As illustrated in FIG. 8, a unit battery 40 includes a container member 41 and an electrode group 42, and also includes a negative electrode terminal 45 and a positive electrode terminal 46 as a pair of electrode terminals.

The container member 41 is formed in a proper shape, and is formed in any one of a flattened shape, a rectangular shape, a cylindrical shape, a coin shape, a button shape, and the like. As the container member 41, either a bag-shaped container formed of a laminate film or a metallic container can be used. As the laminate film, for example, a multilayer film is used, and the multilayer film includes a plurality of resin layers, and metallic layers disposed between the resin layers. The metallic layer of the laminate film is preferably formed of aluminum or an aluminum alloy. In addition, as the material of which the resin layer of the laminate film is formed, use can be made of polymer materials such as polypropylene (PP), polyethylene (PE), nylon, and polyethylene terephthalate (PET). The thickness of the laminate film is preferably 0.5 mm or less, and more preferably 0.2 mm or less. In addition, the inside of the laminate film is sealed, for example, by fusion-bonding the resin layers.

The metallic container is preferably formed of, for example, at least one metal selected from the group consisting of aluminum, zinc, titanium and iron, or an alloy thereof. The wall thickness of the metallic container is preferably 0.5 mm or less, and more preferably 0.2 mm or less. In one example, the metallic container includes a container main body and a lid member, and the lid member is welded to the container main body in the state in which the opening portion of the container main body is closed by the lid member, and thereby the inside of the metallic container is sealed.

Figure 9:
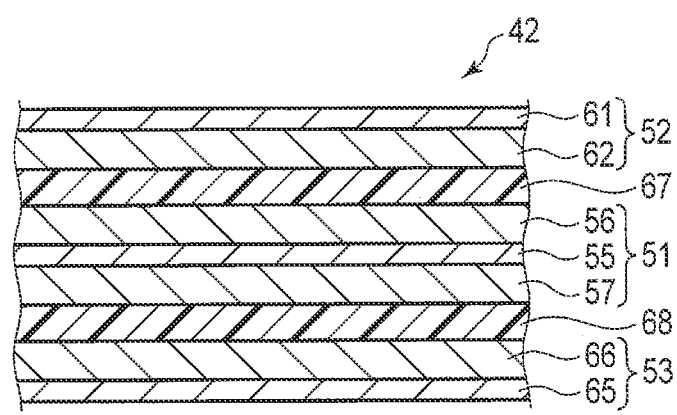
FIG. 9 is a schematic view for describing a structure of an electrode group in the unit battery of FIG. 8.

The electrode group 42 is accommodated in the inside of the container member 41. FIG. 9 is a schematic view for describing a structure of the electrode group in the unit battery of FIG. 8. As illustrated in FIG. 9, the electrode group 42 includes a bipolar electrode 51, a negative electrode 52 and a positive electrode 53. The electrode group 42 is formed of a multilayer body of the bipolar electrode 51, negative electrode 52 and positive electrode 53. In the multilayer body that forms the electrode group 42, the negative electrode 52 is stacked on the bipolar electrode 51, and the positive electrode 53 is stacked on the bipolar electrode 51 from the side opposite to the negative electrode 52.

The bipolar electrode 51 includes a current collector (first current collector) 55, a positive electrode active material-containing layer (first positive electrode active material-containing layer) 56, and a negative electrode active material-containing layer (first negative electrode active material-containing layer) 57. Each of the positive electrode active material-containing layer 56 and the negative electrode active material-containing layer 57 is supported on a surface of the current collector 55. In the example of FIG. 9, the positive electrode active material-containing layer 56 is supported on one surface of the current collector 55, and is supported on that surface of the current collector 55, which faces the side on which the negative electrode 52 is stacked. In addition, the negative electrode active material-containing layer 57 is supported on that surface of the current collector 55, which is opposite to the surface on which the positive electrode active material-containing layer 56 is supported, and the negative electrode active material-containing layer 57 is supported on that surface of the current collector 55, which faces the side on which the positive electrode 53 is stacked.

The negative electrode 52 includes a current collector (second current collector) 61 and a negative electrode active material-containing layer (second negative electrode active material-containing layer) 62. The negative electrode active material-containing layer 62 is supported on a surface of the current collector 61. In the example of FIG. 9, the negative electrode active material-containing layer 62 is supported on one surface of the current collector 61, and is supported on that surface of the current collector 61, which faces the side on which the bipolar electrode 51 is stacked. In addition, the positive electrode 53 includes a current collector (third current collector) 65 and a positive electrode active material-containing layer (second positive electrode active material-containing layer) 66. The positive electrode active material-containing layer 66 is supported on a surface of the current collector 65. In the example of FIG. 9, the positive electrode active material-containing layer 66 is supported on one surface of the current collector 65, and is supported on that surface of the current collector 65, which faces the side on which the bipolar electrode 51 is stacked.

Each of the current collectors 55, 61 and 65 is formed of a metal with electrical conductivity. Each of the current collectors 55, 61 and 65 is, for example, an aluminum foil or an aluminum alloy foil, or the like, although not limited to these, and the thickness thereof is about 10 μm to 30 μm.

Each of the negative electrode active material-containing layers 57 and 62 includes a negative electrode active material, and may include a binder and an electro-conductive agent, where appropriate. In the electrode group 42, each of the negative electrode active material-containing layer 57 and 62 includes lithium titanate as the negative electrode active material. Accordingly, in the electrode group 42, each of the bipolar electrode 51 and the negative electrode 52 includes lithium titanate as the negative electrode active material. By using lithium titanate as the negative electrode active material, the operating electric potential of the negative electrode active material becomes higher than, for example, in the case of using a carbonaceous material as the negative electrode active material, and the operating electric potential of the negative electrode active material becomes, for example, 0.4 V (vs. Li/Li$^+$) or more.

In each of the negative electrode active material-containing layers 57 and 62, the current collecting capability of the active material is enhanced by the electro-conductive agent, and the contact resistance with the current collector can be suppressed. In addition, in each of the negative electrode active material-containing layers 57 and 62, the active material and the electro-conductive agent are bound by the binder. As the electro-conductive agent, use can be made of, for example, carbonaceous materials such as acetylene black, carbon black and graphite. In addition, as the binder, use can be made of, for example, any one of polytetrafluoroethylene (PTFE), polyvinylidene fluoride (PVdF), fluorine-containing rubber, and styrene butadiene rubber.

The mixing ratio between the negative electrode active material, the electro-conductive agent and the binder in each of the negative electrode active material-containing layers 57 and 62 is preferably such that the negative electrode active material is 70 mass % to 96 mass %, the electro-conductive agent is 2 mass % to 28 mass %, and the binder is 2 mass % to 28 mass %. In the formation of the negative electrode active material-containing layers 57 and 62, the negative electrode active material, electro-conductive agent and binder are suspended in an organic solvent, and thus a slurry is prepared. Then, the prepared slurry is coated on one surface of the current collector 55 of the bipolar electrode 51, and the coated slurry is dried and rolled. Thereby, the negative electrode active material-containing layer 57, which is supported on one surface of the current collector 55, is formed. Similarly, the prepared slurry is coated on one surface of the current collector 61 of the negative electrode 52, and the coated slurry is dried and rolled. Thereby, the negative electrode active material-containing layer 62, which is supported on one surface of the current collector 61, is formed.

Each of the positive electrode active material-containing layers 56 and 66 includes a positive electrode active material, and may include a binder and an electro-conductive agent, where appropriate. In the electrode group 42, the positive electrode active material-containing layer 56 includes a first active material as the positive electrode active material, and the positive electrode active material-containing layer 66 includes a second active material as the positive electrode active material, the kind of the second active material being different from the kind of the first active material. Accordingly, in the electrode group 42, the bipolar electrode 51 includes the first active material as the positive electrode active material, and the positive electrode 53 includes the second active material as the positive electrode active material, the kind of the second active material being different from the kind of the first active material.

One of the first active material and the second active material is olivine-type lithium iron phosphate. In addition, the other of the first active material and the second active material, which is different from the olivine-type lithium iron phosphate, is one of lithium nickel cobalt aluminum oxide, lithium nickel manganese cobalt oxide and lithium cobalt oxide. Accordingly, one of the positive electrode active material-containing layers 56 and 66 includes olivine-type lithium iron phosphate as the positive electrode active material, and the other of the positive electrode active material-containing layers 56 and 66 includes one of lithium nickel cobalt aluminum oxide, lithium nickel manganese cobalt oxide and lithium cobalt oxide as the positive electrode active material. In addition, in each of the positive electrode active material-containing layers 56 and 66, the electro-conductive agent and the binder function in the same manner as the electro-conductive agent and the binder of the negative electrode active material-containing layers 57 and 62. Besides, as the electro-conductive agent and the binder of the positive electrode active material-containing layers 56 and 66, use can be made of the same materials as the electro-conductive agent and the binder of the negative electrode active material-containing layers 57 and 62.

The mixing ratio between the positive electrode active material, the electro-conductive agent and the binder in each of the positive electrode active material-containing layers 56 and 66 is preferably such that the positive electrode active material is 80 mass % to 95 mass %, the electro-conductive agent is 3 mass % to 18 mass %, and the binder is 2 mass % to 17 mass %. In the formation of the positive electrode active material-containing layers 56 and 66, the positive electrode active material, electro-conductive agent and binder are suspended in an organic solvent, and thus a slurry is prepared. Then, the prepared slurry is coated on that surface of the current collector 55 of the bipolar electrode 51, which is opposite to the surface that supports the negative electrode active material-containing layer 57, and the coated slurry is dried and rolled. Thereby, the positive electrode active material-containing layer 56, which is supported on one surface of the current collector 55, is formed. Similarly, the prepared slurry is coated on one surface of the current collector 65 of the positive electrode 53, and the coated slurry is dried and rolled. Thereby, the positive electrode active material-containing layer 66, which is supported on one surface of the current collector 65, is formed.

In the unit battery 40, the electrode group 42, which is formed of the multilayer body of the bipolar electrode 51, negative electrode 52 and positive electrode 53, is accommodated in a wound state in the inside of the container member 41. In the electrode group 42, a separator 67 is interposed between the positive electrode active material-containing layer 56 of the bipolar electrode 51 and the negative electrode active material-containing layer 62 of the negative electrode 52, and the separator 67 prevents a contact between the bipolar electrode 51 and the negative electrode 52. Similarly, in the electrode group 42, a separator 68 is interposed between the negative electrode active material-containing layer 57 of the bipolar electrode 51 and the positive electrode active material-containing layer 66 of the positive electrode 53, and the separator 68 prevents a contact between the bipolar electrode 51 and the positive electrode 53. Furthermore, in the electrode group 42 that is disposed in the wound state in the inside of the container member 41, a separator (not shown) is interposed between the negative electrode 52 and the positive electrode 53, and the separator prevents a contact between the negative electrode 52 and the positive electrode 53.

The separators, such as the separators 67 and 68, are formed of an electrically insulating material. Thus, in the electrode group 42, the bipolar electrode 51, negative electrode 52 and positive electrode 53 are electrically insulated from each other by the separators. As the separators, use can be made of porous films and nonwoven fabric, or the like, of synthetic resin, although not limited to these. Examples of the synthetic resin, of which the separators are formed, include polyethylene, polypropylene, cellulose, and polyvinylidene fluoride (PVdF).

In addition, in the inside of the container member 41, an electrolytic solution is held in the electrode group 41 (the electrode group 41 is impregnated with an electrolytic solution). The electrolytic solution may be a nonaqueous electrolytic solution in which an electrolyte is dissolved in an organic solvent, or may be an aqueous electrolytic solution, such as an aqueous solution, in which an electrolyte is dissolved in an aqueous solvent. As the electrolyte dissolved in the organic solvent, use is made of, for example, one kind of a lithium salt, or a mixture in which two or more kinds of lithium salts are mixed. However, when the electrolytic solution is used as the electrolyte, it is necessary to provide shielding or the like for preventing charge/discharge between the negative electrode 52 and the positive electrode 53. In addition, a gel electrolyte, in which an electrolytic solution and a polymer material are compounded, may be used in place of the electrolytic solution. Furthermore, a solid electrolyte may be used in place of the electrolytic solution, or in addition to the electrolytic solution. When the solid electrolyte is used as the electrolyte, the bipolar electrode 51, negative electrode 52 and positive electrode 53 in the electrode group 42 may be electrically insulated from each other by the solid electrolyte in place of the separators. If either the gel electrolyte or the solid electrolyte is used as the electrolyte, this is preferable since charge/discharge between the negative electrode 52 and the positive electrode 3 can be prevented.

Each of the negative electrode terminal 45 and positive electrode terminal 46, which serve as a pair of electrode terminals, may be an internal terminal that is formed in the inside of the container member 41, or may be an external terminal that is formed on an outer surface of the container member 41. The electrode terminal is formed of an electrically conductive material, and is preferably formed of at least one metal selected from the group consisting of aluminum, zinc, titanium and iron, or an alloy thereof.

The current collector 61 of the negative electrode 52 is electrically connected to the negative electrode terminal 45. The current collector (negative electrode current collector) 61 may be directly connected to the negative electrode terminal 45, or may be connected to the negative electrode terminal 45 via one or more leads formed of an electrically conductive material. Besides, the current collector 65 of the positive electrode 53 is electrically connected to the positive electrode terminal 46. The current collector (positive electrode current collector) 65 may be directly connected to the positive electrode terminal 46, or may be connected to the positive electrode terminal 46 via one or more leads formed of an electrically conductive material.

In addition, in the unit battery 40, the electric potential at the negative electrode terminal 45 and the current collector 61 of the negative electrode 52 is the negative electrode electric potential of the unit battery 40, and the electric potential at the positive electrode terminal 46 and the current collector 65 of the positive electrode 53 is the positive electrode electric potential of the unit battery 40. Furthermore, the electric potential at the current collector 55 of the bipolar electrode 51 is higher than the negative electrode electric potential and is lower than the positive electrode electric potential. In the unit battery 40, the electric potential difference between the current collector 61 (negative electrode terminal 45) of the negative electrode 52 and the current collector 65 (positive electrode terminal 46) of the positive electrode 53 corresponds to the voltage that is applied to the entirety of the unit battery 40. In addition, the electric potential difference between the current collector 61 of the negative electrode 52 and the current collector 55 of the bipolar electrode 51 corresponds to a voltage $V\alpha$ that is applied to the stacked portion of the positive electrode active material-containing layer 56 and negative electrode active material-containing layer 62, and the electric potential difference between the current collector 65 of the positive electrode 53 and the current collector 55 of the bipolar electrode 51 corresponds to a voltage $V\beta$ that is applied to the stacked portion of the negative electrode active material-containing layer 57 and positive electrode active material-containing layer 66.

In the unit battery 40, lithium titanate is used as the negative electrode active material of each of the bipolar electrode 51 and the negative electrode 52. Thus, unlike the case in which a carbonaceous material or the like is used as the negative electrode active material, a lithium metal is not precipitated in each of the negative electrode active material-containing layers 57 and 62 in the charge or the like of the unit battery 40. Thereby, even if the unit battery 40 is charged at a high charge rate, the deterioration of the unit battery 40 and the secondary battery formed of the unit battery 40 is properly suppressed, and the secondary battery can safely be charged.

In addition, in the unit battery 40, the kind of the first active material used as the positive electrode active material of the bipolar electrode 51 is different from the kind of the second active material used as the positive electrode active material of the positive electrode 53. Thus, in the electrode group 42, the voltage (first voltage) $V\alpha$ between the current collector 61 of the negative electrode 52 and the current collector 55 of the bipolar electrode 51 is different in magnitude from the voltage (second voltage) $V\beta$ between the current collector 65 of the positive electrode 53 and the current collector 55 of the bipolar electrode 51. For example, it is assumed that the positive electrode active material-containing layer 56 of the bipolar electrode 51 includes olivine-type lithium iron phosphate as the first active material, and the positive electrode active material-containing layer 66 of the positive electrode 53 includes one of lithium nickel cobalt aluminum oxide, lithium nickel manganese cobalt oxide and lithium cobalt oxide as the second active material. In this case, in the full charge state (the state in which SOC is 100%) of the unit battery 40, the voltage $V\alpha$ between the current collectors 55 and 61 is about 2.2 V, and the voltage $V\beta$ between the current collectors 55 and 65 is about 2.7 V. Note that if the first active material and the second active material are reversed, the magnitudes of the voltages $V\alpha$ and $V\beta$ are also reversed.

Here, it is assumed that the electrode group is formed of a positive electrode and a negative electrode, and the unit battery, in which the negative electrode includes a carbonaceous material as the negative electrode active material, is a carbonaceous negative electrode unit battery. It is assumed that a bipolar electrode is not provided in the electrode group of the carbonaceous negative electrode unit battery. In one example, the electrode group of the carbonaceous negative electrode unit battery is formed of a negative electrode including graphite that is one kind of carbonaceous material as a negative electrode active material, and a positive electrode including lithium cobalt oxide as a positive electrode active material.

In the unit battery 40, the electrode group 42 is formed as described above, and thereby, in the full charge state of the unit battery 40, the inter-terminal voltage, which is the voltage between the negative terminal 45 and the positive terminal 46 (the electric potential difference between the negative electrode electric potential and the positive electrode electric potential), is about 4.9 V, and is less than 5 V. Thus, the difference of the inter-terminal voltage of the unit battery 40 in the full charge state from the inter-terminal voltage of the carbonaceous negative electrode unit battery in the full charge state does not become large. In addition, the shift of the variation range of the inter-terminal voltage in the unit battery 40 from the variation range of the inter-terminal voltage of the carbonaceous negative electrode unit battery does not become large. Thus, the control system, which was used for controlling the charge/discharge of the secondary battery formed of the carbonaceous negative electrode unit battery, can easily be applied to the control of charge/discharge of the secondary battery formed of the unit battery 40.

Moreover, in the unit battery 40, the voltage Vα between the current collectors 55 and 61 and the voltage Vβ between the current collectors 55 and 65 can be measured. Thus, based on the measurement result or the like of the voltage Vα, the deterioration state of the stacked portion of the positive electrode active material-containing layer 56 and the negative electrode active material-containing layer 62 can be estimated, and, based on the measurement result or the like of the voltage Vβ, the deterioration state of the stacked portion of the negative electrode active material-containing layer 57 and the positive electrode active material-containing layer 66 can be estimated. Specifically, it is possible to locally estimate, in addition to the deterioration state of the entirety of the unit battery 40, the deterioration state of the stacked portion of the positive electrode active material-containing layer 56 and the negative electrode active material-containing layer 62 and the deterioration state of the stacked portion of the negative electrode active material-containing layer 57 and the positive electrode active material-containing layer 66.

In the present embodiment, the secondary battery 5 is formed of the unit battery 40 including the above-described electrode group 42. Thereby, the secondary battery 5 is properly charged by the charge pattern that is set as described above. Accordingly, the secondary battery 5 formed of the unit battery 40 can safely and properly be charged by effectively using the time in which the charge can be executed.

In at least one of the above-described embodiments or examples, the charge pattern in the charge that is planned to be executed is set based on the estimation data including the estimation result of the internal state of the secondary battery, the estimation result being based on the measurement result of the electric current and voltage of the secondary battery; the target data including the target time for charging the secondary battery in the charge that is planned to be executed; and the relation data indicative the relation of each of the internal state of the secondary battery and the charge condition of the secondary battery relative to the deterioration rate of the secondary battery. The charge pattern is set to be the charge pattern in which the deterioration rate does not exceed the threshold and the secondary battery is charged during the target time. Thereby, there can be provided a management method of a secondary battery, a charge method of a secondary battery, a management device of a secondary battery, and a management system of a secondary battery, which enable a secondary battery to be safely and properly charged by effectively using a time in which charge can be executed.

In at least one of the above-described embodiments or examples, in the electrode group, the bipolar electrode includes lithium titanate as the negative electrode active material, and includes the first active material as the positive electrode active material. In addition, in the electrode group, the negative electrode is stacked on the bipolar electrode, and includes lithium titanate as the negative electrode active material. Besides, in the electrode group, the positive electrode is stacked on the bipolar electrode from the side opposite to the negative electrode, and includes the second active material as the positive active material, the kind of the second active material being different from the kind of the first active material. Thereby, there can be provided an electrode group and a unit battery, which enable a secondary battery to be safely and properly charged by effectively using a time in which charge can be executed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management method of a secondary battery comprising:
setting a charge pattern in charge that is planned to be executed, based on estimation data including an estimation result of an internal state of the secondary battery, target data including a target time for charging the secondary battery in the charge that is planned to be executed, and relation data indicative a relation of each of the internal state of the secondary battery and a charge condition of the secondary battery relative to a deterioration rate of the secondary battery, the estimation result being based on a measurement result of an electric current and a voltage of the secondary battery in charge or discharge of the secondary battery, the charge pattern being set to be a charge pattern in which the deterioration rate does not exceed a threshold and the secondary battery is charged during the target time,
wherein, in the setting of the charge pattern in the charge that is planned to be executed, the management method further comprises:
calculating, based on the estimation data and the relation data, an upper-limit value of a charge current under a condition that the deterioration rate does not exceed the threshold, and a variation with time of the upper-limit value of the charge current during the target time; and
setting, as the charge pattern in the charge that is planned to be executed, a charge pattern in which the charge current does not continuously exceed the upper-limit value during the target time, based on a calculation result of the variation with time of the upper-limit value of the charge current during the target time.

2. The management method of claim 1, further comprising calculating the target time, based on an activity content that is performed by a user of a battery-mounted device, in which the secondary battery is mounted, in parallel in time with the charge that is planned to be executed.

3. The management method of claim 2, further comprising estimating the activity content that is performed by the user, based on a content of a service that is provided to the user of the battery-mounted device in parallel in time with the charge that is planned to be executed.

4. The management method of claim 1, wherein
the target data includes a target SOC of the secondary battery at a time of an end of the charge that is planned to be executed, and
the charge pattern in the charge that is planned to be executed is set to be a charge pattern in which an SOC of the secondary battery at a time of an end of the target time becomes the target SOC.

5. The management method of claim 1, wherein the relation data, which is used in the setting of the charge pattern in the charge that is planned to be executed, indicates a relation of a use history of the secondary battery relative to the deterioration rate of the secondary battery, in addition to the relation of each of the internal state of the secondary battery and the charge condition of the secondary battery relative to the deterioration rate of the secondary battery.

6. A charge method of a secondary battery, comprising:
setting, by the management method of claim 1, a charge pattern in the charge that is planned to be executed; and
charging the secondary battery by the charge pattern that is set.

7. A management device of a secondary battery, comprising:
a processor configured to set a charge pattern in charge that is planned to be executed, based on estimation data including an estimation result of an internal state of the secondary battery, target data including a target time for charging the secondary battery in the charge that is planned to be executed, and relation data indicative a relation of each of the internal state of the secondary battery and a charge condition of the secondary battery relative to a deterioration rate of the secondary battery, the estimation result being based on a measurement result of an electric current and a voltage of the secondary battery in charge or discharge of the secondary battery, the charge pattern being set to be a charge pattern in which the deterioration rate does not exceed a threshold and the secondary battery is charged during the target time,
wherein, in the setting of the charge pattern in the charge that is planned to be executed, the processor is configured to:
calculate, based on the estimation data and the relation data, an upper-limit value of a charge current under a condition that the deterioration rate does not exceed the threshold, and a variation with time of the upper-limit value of the charge current during the target time; and
set, as the charge pattern in the charge that is planned to be executed, a charge pattern in which the charge current does not continuously exceed the upper-limit value during the target time, based on a calculation result of the variation with time of the upper-limit value of the charge current during the target time.

8. The management device of claim 7, wherein the management device is configured to function as a charger, the processor being configured to charge the secondary battery by the charge pattern that is set, by controlling supply of electric power to the secondary battery from an electric power source, based on the charge pattern that is set.

9. A management system of a secondary battery, comprising:
the management device of claim 7; and
the secondary battery managed by the management device.

10. The management system of claim 9, further comprising a battery-mounted device in which the secondary battery is mounted.

11. The management system of claim 9, wherein
the secondary battery includes a unit battery,
the unit battery includes an electrode group, and
the electrode group of the unit battery includes:
a bipolar electrode including lithium titanate as a negative electrode active material, and including a first active material as a positive electrode active material;
a negative electrode stacked on the bipolar electrode and including lithium titanate as a negative electrode active material; and
a positive electrode stacked on the bipolar electrode from a side opposite to the negative electrode, and including a second active material as a positive electrode active material, a kind of the second active material being different from a kind of the first active material.

* * * * *